United States Patent [19]

Tanaka et al.

[11] Patent Number: 4,916,216

[45] Date of Patent: Apr. 10, 1990

[54] PROCESS FOR GRANULATING AZOBISAMIDINE SALTS USING AN AQUEOUS BINDER

[75] Inventors: Motoaki Tanaka, Urawa; Takanori Toyama, Kawagoe; Hiroki Sugioka, Sakado, all of Japan

[73] Assignee: Wako Pure Chemical Industries, Ltd., Osaka, Japan

[21] Appl. No.: 48,335

[22] Filed: May 11, 1987

[30] Foreign Application Priority Data

May 13, 1986 [JP] Japan ................................ 61-109127

[51] Int. Cl.$^4$ ................. C07C 103/30; C07C 107/02; C07C 123/00; C07C 13/00
[52] U.S. Cl. ..................................... 534/738; 534/751; 534/838; 534/887
[58] Field of Search ................................ 534/738, 887

[56] References Cited

U.S. PATENT DOCUMENTS 2,599,299  6/1952  Upson ................................. 534/838
4,256,636  3/1981  Roos et al. ......................... 534/838

FOREIGN PATENT DOCUMENTS 301329   4/1971  U.S.S.R. ............................. 534/738
1198782  7/1970  United Kingdom ................ 534/738

*Primary Examiner*—Floyd D. Higel
*Attorney, Agent, or Firm*—Armstrong, Nikaido, Marmelstein, Kubovcik & Murray

[57] ABSTRACT

Granules of azobisamidine salt can be produced by granulating a powder of azobisamidine salt using a limited amount of water or a mixture of water and a water-soluble organic solvent such as methanol are convenient in handling without deteriorating the quality and can be used as a water-soluble polymerization initiator.

4 Claims, No Drawings

PROCESS FOR GRANULATING AZOBISAMIDINE SALTS USING AN AQUEOUS BINDER

BACKGROUND OF THE INVENTION

This invention relates to a process for granulating an azobisamidine salt used as a polymerization initiator in aqueous solution polymerization and emulsion polymerization.

Azobisamidine salts exemplified typically by 2,2'-azobisisobutylamidine hydrochloride or acetate, 2,2'-azobis(N,N'-dimethyleneisobutylamidine) hydrochloride or acetate, etc., are readily soluble in water as estimated from their structures, and thus used as a polymerization initiator in aqueous solution polymerization or emulsion polymerization. That is, when they are used in the form of an acidic aqueous solution, they act as highly active water-soluble polymerization initiators. Further, when they are used as a polymerization initiator for emulsion polymerization, there is obtained a polymer having positively charged terminals. The azobisamidine salts can be used variously, for example, for polymerization of water-soluble monomers such as acrylamide, allylamine, vinylpyrrolidone, etc., production of cationic polymers, polymerization of fluorine resins, various emulsion polymerization, photopolymerization, and the like. The azobisamidine salts are usually in the form of fine powder and irritate the skin, so that they are unfavorable for handling from the viewpoint of health. But, the azobisamidine salts are highly active in aqueous solution and are easily decomposed as mentioned above, and it is well known that when they are allowed to stand in water, they deteriorate in quality with the lapse of time. Therefore, the use of water for granulation of the azobisamidine salts was not thought of, although the granulation of azobisamidine salts has long been desired. Further, since there has been found no suitable binder for the granulation, the azobisamidine salts have been used in the form of fine powders.

SUMMARY OF THE INVENTION

It is the object of the present invention to provide a process for producing granular azobisamidine salts and thus produced granulated azobisamidine salts.

The present invention provides a process for producing granules of an azobisamidine salt of the formula:

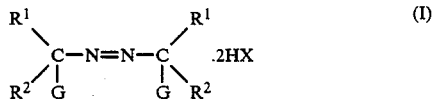

wherein $R^1$ and $R^2$ are independently an alkyl group or a cycloalkyl group, and may form an aliphatic ring by combining $R^1$ and $R^2$; G is a guanyl group of the formula:

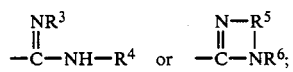

$R^3$ and $R^4$ are independently hydrogen, an alkyl group, a substituted alkyl group, a cycloalkyl group, an allyl group, a phenyl group or a substituted phneyl group; $R^5$ is a lower alkylene group which may have one or more substituents; $R^6$ is hydrogen or a hydroxyalkyl group; and X is Cl, Br or a group of the formula: CH$_3$COO—, which comprises granulating a powder of azobisamidine salt of the formula (I) by using water or a mixture of water and a water-soluble organic solvent as a binder.

This invention also provides granules of the azobisamidine salt of the formula (I) thus produced having a particle size of about 300 μm or more in a content of 90% by weight or more usable as water-soluble polymerization initiator or other purposes.

DESCRIPTION OF THE PREFERRED EMBODIMENTS

According to the present invention, granules of azobisamidine salts can be produced by using a limited amount of water as a binder without deteriorating the quality of the azobisamidine salts with the lapse of time.

The azobisamidine salts used in the present invention are represented by the formula:

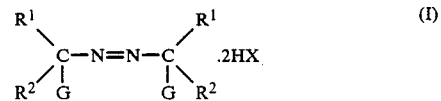

In the formula (I), $R^1$ and $R^2$ are independently an alkyl group such as a methyl group, an ethyl group, a propyl group, a butyl group, an amyl group, and a hexyl group; or a cycloalkyl group such as a cyclopropyl group, a cycloheptyl group and a cyclohexyl group. $R^1$ and $R^2$ may form an aliphatic ring such as cyclohexane, cycloheptane, cyclooctane, or the like by combining $R^1$ and $R^2$.

G in the formula (I) is a guanyl group of the formula:

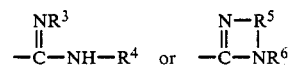

wherein $R^3$ and $R^4$ are independently hydrogen, a straight- or branched-chain alkyl group such as a methyl group, an ethyl group, a propyl group, a butyl group, a pentyl group, a hexyl group, an octyl group, a nonyl group, a decyl group, etc., a substituted alkyl group such as a hydroxymethyl group, a hydroxyethyl group, a hydroxypropyl group, a chloroethyl group, a bromoethyl group, a chloropropyl group, a bromopropyl group, a benzyl group, a phenethyl group, etc., a cycloalkyl group such as a cyclopropyl group, a cycloheptyl group, a cyclohexyl group, etc., an allyl group, a phenyl group, or a substituted phenyl group such as a tolyl group, an ethylphenyl group, a methoxyphenyl group, an ethoxyphenyl group, a hydroxyphenyl group, a nitrophenyl group, an aminophenyl group, an acetylphenyl group, an acetylaminophenyl group, etc.; $R^5$ is a lower alkylene group such as —CH$_2$CH$_2$—, —CH$_2$—CH$_2$—CH$_2$—, etc., or a substituted lower alkylene group wherein one or more hydrogen atoms in the lower alkylene group is substituted with one or more lower alkyl groups such as a methyl group, an ethyl group, a propyl group, a butyl group, etc., or a hydroxyl group; and $R^6$ is hydrogen, or a hydroxyalkyl group such as a hydroxymethyl group, a hydroxyethyl group, a hydroxypropyl group, etc.

HX in the formula (I) is HCl, HBr or CH$_3$COOH.

The present invention is characterized by using a limited amount of water as a binder for granulation. The use of water as a binder is very important but this does not mean exclusion of another auxiliary solvent. For example, methanol, ethanol, isopropanol, or the like alcohol is well miscible with water and can easily be removed by vaporization. Such an auxiliary solvent can be used together with water so long as it does not damage the effect of water as a binder. In other words, such an auxiliary solvent can be used together with water in this invention.

Examples of the auxiliary solvent are water-soluble organic solvent, e.g., lower alcohols such as methanol, ethanol, isopropanol, etc., ketones such as acetone, methyl ethyl ketone, etc., dioxane, dimethylformamide, dimethylsulfoxide, acetonitrile, etc.

The above-mentioned water-soluble organic solvents can function as a binder only when used together with water and do not show the function of binder when used as they are like other water-insoluble organic solvents such as aromatic hydrocarbons, halogenated hydrocarbons, ethers, etc.

The amount of water used as a binder changes depending on dryness of an azobisamidine salt to be granulated, the kind of granulators used, granulating conditions or methods, etc. In the case of using a well dried azobisamidine salt it is preferable to use 10~22%, more preferably 12~20%, by weight of water based on the weight the azobisamidine salt. In the case of using non-dried azobisamidine salt (usually about 5 to 15% by weight of methanol which was used for washing is retained), it is preferable to use 5~18%, more preferably 6~15%, by weight of water based on the weight of the azobisamidine salt (on dry basis).

When a mixture of water and a water-soluble organic solvent is used, it is preferable to use 0 to 1.5 parts by weight, more preferably 0.5 to 1.3 parts by weight of the water-soluble organic solvent per part by weight of water. In this case, it is preferable to use the mixture of water and the water-soluble organic solvent so as to make the amount of water 5 to 18% by weight, more preferably 6 to 15% by weight, based on the weight of azobisamidine salt (dry basis).

According to the present invention, the azobisamidine salts which are highly active and easily decomposed in an aqueous solution can be granulated remarkably stably by using a limited amount of water as a binder without deteriorating the quality. This is a very unexpected thing.

The granulation of the azobisamidine salt of the formula (I) can be carried out by a conventional method such as an extrusion granulation method, a rolling granulation method, a spray granulation method, or the like. The granulation temperature is not limited and usually at room temperature.

The granulation method is explained in detail referring to an extrusion granulation method as one example by using 2,2'-azobisisobutylamidine hydrochloride powder (V-50, a trade name, mfd. by Wako Pure Chemical Industries, Ltd.). First, a suitable amount of water is added to a V-50 powder and kneading is carried out to regulate the bonding force of the powder. After compressing for making vacant spaces minimum, the compressed powder is extruded from a die having a form for forming granules. As the granulator, there can be used a granulator, a pelleter, or the like. When a screw type pelleter is used, a suitable amount of water, preferably in an amount of about 10 to 20% by weight, is added to the V-50 powder, followed by mixing, kneading and granulating to give cylindrical granules. The quality of the V-50 granules is the same as that of the powder and the strength of granules and the stability of granules with the lapse of time are sufficient.

Further, according to the process of the present invention, there can easily be obtained granules of the azobisamidine salt of the formula (I) having a particle size of about 300 μm or more in a content of 90% by weight or more with high strength.

The present invention is explained in detail by way of the following Examples, in which all percents are by weight unless otherwise specified.

EXAMPLE 1

To 1.0 kg of V-50 powder (dried material), about 13.3% of water based on the weight of the V-50 powder was added and kneaded, followed by granulation by using an EXD-60 type pelleter (mfd. by Fuji Pandal Co., Ltd.). After drying, there were obtained granules having a particle size of 300 μm or more in a content of 90% or more.

There was observed no significant difference between the quality of the powder before granulation and that of the granules obtained. When the granules were subjected to a vibration test, no destruction of the granules was observed. The vibration test was carried out as follows. In a test tube vibrator (mfd. by Nippon Koden Kenkyusho K.K.), the V-50 granules were placed at a height of 75 mm and subjected to vibration of 120 reciprocations/min and amplitude of vibration of 7 cm for 30 minutes. Further, when the V-50 granules were packed in bags and carried by a truck at a distance of 1000 km or more (the transportation test), almost no destruction of the granules was observed. In addition, there was observed no change in properties when the granules were stored at room temperature for 4 months or more.

EXAMPLE 2

The process of Example 1 was repeated except for using about 18.4% of water. The resulting granules had the same properties as those obtained in Example 1.

The V-50 granules obtained in Example 2 had the following particle size distribution:

| Mesh | % |
| --- | --- |
| 7–32 (500–2830 μm) | 93.3 |
| 32–42 (350–500 μm) | 3.1 |
| 42–80 | 2.8 |
| 80 or more | 0.8 |

EXAMPLE 3

The process of Example 1 was repeated except for using 3 kg of non-dried V-50 (weight loss by drying was 10.1% essentially due to loss of methanol) in place of 1.0 kg of V-50 powder. The resulting granules had the same properties as those obtained in Example 1.

The V-50 granules obtained in Example 3 had the following particle size distribution:

| Mesh | % |
| --- | --- |
| 8–32 (500–2380 μm) | 94.6 |
| 32–48 (297–500 μm) | 3.4 |
| 48–80 | 1.2 |
| 80 or more | 0.8 |

EXAMPLE 4

The process of Example 1 was repeated except for using 4 kg of non-dried V-50 (weight loss by drying was 8.7% essentially due to loss of methanol) in place of 1.0 kg of V-50 powder, and using about 7% of water in place of about 13.3% of water. The resulting granules had the same properties as those obtained in Example 1.

The V-50 granules obtained in Example 4 had the following particle size distribution:

| Mesh | % |
|---|---|
| 8-32 | 93.5 |
| 32-48 | 4.1 |
| 48-80 | 1.5 |
| 80 or more | 0.9 |

EXAMPLE 5

The process of Example 1 was repeated except for using about 8% of water and about 10% of methanol in place of about 13.3% of water. The resulting granules had the same properties as those obtained in Example 1.

The V-50 granules obtained in Example 5 had the following particle size distribution:

| Mesh | % |
|---|---|
| 8-32 | 93.0 |
| 32-48 | 3.5 |
| 48-80 | 2.3 |
| 80 or more | 1.2 |

EXAMPLE 6

The process of Example 1 was repeated except for using 4 kg of non-dried V-50 (weight loss by drying was 6.7% almost due to methanol) in place of 1.0 kg of V-50 powder, and about 9% of water and about 5% of methanol in place of about 13.3% of water. The resulting granules had the same properties as those obtained in Example 1.

The V-50 granules obtained in Example 6 had the following particle size distribution:

| Mesh | % | |
|---|---|---|
| 8 or less | 0.05 | |
| 8-12 (1410-2380 μm) | 71.6 | |
| 12-48 (297-1410 μm) | 23.65 | } 95.25 |
| 48 or more | 4.7 | |

EXAMPLE 7

The process of Example 1 was repeated except for using 4 kg of non-dried V-50 (weight loss by drying was 6.7% essentially due to less of methanol) in place of 1.0 kg of V-50 powder, and about 14% of water in place of about 13.3% of water. The resulting granules had the same properties as those obtained in Example 1.

The V-50 granules obtained in Example 7 had the following particle size distribution:

| Mesh | % | |
|---|---|---|
| 8 or less | 0.25 | |
| 8-12 | 79.7 | |
| 12-48 | 19.8 | } 99.5 |
| 48 or more | 0.25 | |

EXAMPLE 8

The process of Example 5 was repeated except for using about 9% of water and about 10% of acetonitrile in place of about 8% of water and about 10% of methanol. The resulting granules had the same properties as those obtained in Example 5.

The same result was obtained when ethanol, isopropanol, dioxane, or dimethylformamide was used in place of acetonitrile.

EXAMPLE 9

The process of Example 1 was repeated except for using a powder of 2,2'-azobis(N,N'-dimethyleneisobutylamidine) hydrochloride (VA-044, a trade name, mfd. by Wako Pure Chemical Industries, Ltd.) in place of the V-50 powder. The resulting granules had the same properties as those obtained in Example 1.

The VA-044 granules obtained in Example 9 had the following particle size distribution:

| Mesh | % |
|---|---|
| 8-32 | 93.9 |
| 32-48 | 3.5 |
| 48-80 | 1.8 |
| 80 or more | 0.8 |

According to the present invention, since the azobisamidine salts which have been used in powder and are effective as water-soluble radical polymerization initiator can be granulated, the workability in the practical use or handling of the azobisamidine salts can be improved due to better fluidity than in fine powder state and the problem of dusting can be solved. Thus, the expansion of the utility of the azobisamidine salts can be expected.

What is claimed is:

1. A process for producing granules of an azobisamidine salt of the formula:

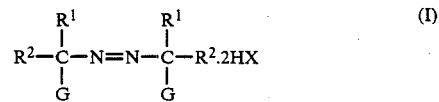

wherein $R^1$ and $R^2$ are independently selected from the group consisting of $C_{1-6}$ alkyl, $C_{3-6}$ cycloalkyl and an aliphatic ring wherein $R^1$ and $R^2$, together with the carbon to which they are attached, are bonded together to form a ring containing 4 to 8 carbon atoms; G is a guanyl group of the formula

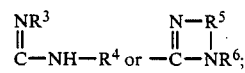

wherein $R^3$ and $R^4$ are independently selected from the group consisting of hydrogen, $C_{1-10}$ alkyl, $C_{1-10}$ alkyl substituted with a substituent selected from the group consisting of hydroxy, chloro, bromo, and phenyl, $C_{3-6}$ cycloalkyl, allyl, phenyl, phenyl substituted with a substituent selected from the group consisting of methyl, ethyl, methoxy, ethoxy, hydroxy, nitro, amino, acetyl and acetylamino; $R^5$ is a lower alkylene or lower alkylene having one or more substituents selected from the group consisting of $C_{1-4}$ alkyl and hydroxy; $R^6$ is hydrogen or a hydroxyalkyl; and X is selected from the group consisting of Cl, Br and $CH_3COO—$, which comprises granulating a powder of azobisamidine salt using a mixture of water and a water-soluble organic solvent as a binder, wherein the mixture of water and a water-soluble organic solvent is adjusted to make the amount of water 5 to 18% by weight, based on the weight of the azobisamidine salt.

2. A process according to claim 1, wherein the water-soluble organic solvent is used in an amount of 1.5 parts by weight or less per part by weight of water.

3. A process according to claim 2, wherein the water-soluble organic solvent is methanol.

4. A process for producing granules of an azobisamidine salt of the formula:

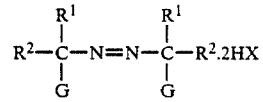

wherein $R^1$ and $R^2$ are independently selected from the group consisting of $C_{1-6}$ alkyl, $C_{3-6}$ cycloalkyl and an aliphatic ring wherein $R^1$ and $R^2$ together with the carbon to which they are attached are bonded together to form a ring containing 4 to 8 carbon atoms; G is a guanyl group of the formula:

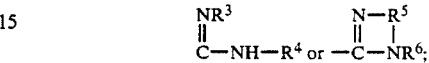

wherein $R^3$ and $R^4$ are independently selected from the group consisting of hydrogen, $C_{1-10}$ alkyl, $C_{1-10}$ alkyl substituted with a substituent selected from the group consisting of hydroxy, chloro, bromo, and phenyl, $C_{3-6}$ cycloalkyl, allyl, phenyl, phenyl substituted with a substituent selected from the group consisting of methyl, ethyl, methoxy, ethoxy, hydroxy, nitro, amino, acetyl and acetylamino; $R^5$ is a lower alkylene group or lower alkylene having one or more substituents selected from the group consisting of $C_{1-4}$ alkyl and hydroxy; $R^6$ is hydrogen or a hydroxyalkyl; and X is selected from the group consisting of Cl, Br and $CH_3COO—$, which comprises granulating a powder of azobisamidine salt using water as a binder, wherein the water is used in the amount of 10 to 22% by weight, based on the weight of the azobisamidine salt.

* * * * *